(12) United States Patent
Rouby

(10) Patent No.: US 11,052,986 B2
(45) Date of Patent: Jul. 6, 2021

(54) AERONAUTIC GLAZING COMPRISING A SHEET OF ACRYLIC POLYMER HAVING IMPROVED MECHANICAL PROPERTIES

(71) Applicant: SAINT-GOBAIN GLASS FRANCE, Courbevoie (FR)

(72) Inventor: Michel Rouby, Bray en Val (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 279 days.

(21) Appl. No.: 16/311,325

(22) PCT Filed: Jun. 22, 2017

(86) PCT No.: PCT/FR2017/051658
§ 371 (c)(1),
(2) Date: Dec. 19, 2018

(87) PCT Pub. No.: WO2018/002481
PCT Pub. Date: Jan. 4, 2018

(65) Prior Publication Data
US 2019/0233078 A1   Aug. 1, 2019

(30) Foreign Application Priority Data

Jun. 29, 2016   (FR) ...................................... 1656060

(51) Int. Cl.
| | | |
|---|---|---|
| *B32B 7/12* | (2006.01) | |
| *B32B 1/00* | (2006.01) | |
| *B32B 3/26* | (2006.01) | |
| *B64C 1/14* | (2006.01) | |
| *B32B 17/10* | (2006.01) | |
| *B32B 27/30* | (2006.01) | |
| *B32B 27/20* | (2006.01) | |
| *B32B 27/08* | (2006.01) | |
| *B32B 27/36* | (2006.01) | |
| *B32B 27/40* | (2006.01) | |

(52) U.S. Cl.
CPC .............. *B64C 1/1476* (2013.01); *B32B 7/12* (2013.01); *B32B 17/10018* (2013.01); *B32B 17/10036* (2013.01); *B32B 17/1077* (2013.01); *B32B 17/10137* (2013.01); *B32B 17/10743* (2013.01); *B32B 17/10752* (2013.01); *B32B 17/10761* (2013.01); *B32B 27/08* (2013.01); *B32B 27/20* (2013.01); *B32B 27/308* (2013.01); *B32B 27/365* (2013.01); *B32B 27/40* (2013.01); *B32B 2250/40* (2013.01); *B32B 2255/10* (2013.01); *B32B 2255/24* (2013.01); *B32B 2307/30* (2013.01); *B32B 2307/308* (2013.01); *B32B 2307/412* (2013.01); *B32B 2307/546* (2013.01); *B32B 2307/558* (2013.01); *B32B 2307/584* (2013.01); *B32B 2307/71* (2013.01); *B32B 2307/712* (2013.01); *B32B 2307/714* (2013.01); *B32B 2307/72* (2013.01); *B32B 2307/738* (2013.01); *B32B 2551/00* (2013.01); *B32B 2571/00* (2013.01); *B32B 2605/00* (2013.01); *B32B 2605/006* (2013.01); *B32B 2605/18* (2013.01); *B64C 1/1492* (2013.01)

(58) Field of Classification Search
None
See application file for complete search history.

(56) References Cited

U.S. PATENT DOCUMENTS

| | | | | |
|---|---|---|---|---|
| 2002/0110693 | A1* | 8/2002 | Richard | ................. B32B 27/08 428/412 |
| 2007/0235692 | A1 | 10/2007 | Wu et al. | |
| 2011/0183135 | A1* | 7/2011 | Gerard | .................... C08L 33/12 428/220 |
| 2012/0094084 | A1* | 4/2012 | Fisher | ............... B32B 17/10761 428/174 |

FOREIGN PATENT DOCUMENTS

| | | |
|---|---|---|
| CN | 101955572 A | 1/2011 |
| FR | 3 013 508 A1 | 5/2015 |
| WO | WO 02/47908 A1 | 6/2002 |
| WO | WO 2012/085487 A1 | 6/2012 |
| WO | WO 2012/136941 A1 | 10/2012 |

OTHER PUBLICATIONS

International Search Report as issued in International Patent Application No. PCT/FR2017/051658, dated Aug. 4, 2017.

\* cited by examiner

*Primary Examiner* — Sheeba Ahmed
(74) *Attorney, Agent, or Firm* — Pillsbury Winthrop Shaw Pittman LLP

(57) ABSTRACT

An aeronautical glazing unit includes at least one sheet of modified acrylic, wherein the sheet is combined with at least one other sheet of modified acrylic, and/or at least one sheet of cast poly(methyl methacrylate) (PMMA), and/or at least one sheet of another transparent polymer such as polycarbonate (PC), and/or at least one sheet of glass in particular that is chemically strengthened, as a laminated and/or multiple glazing unit.

11 Claims, 2 Drawing Sheets

AERONAUTIC GLAZING COMPRISING A SHEET OF ACRYLIC POLYMER HAVING IMPROVED MECHANICAL PROPERTIES

CROSS-REFERENCE TO RELATED APPLICATIONS

This application is the U.S. National Stage of PCT/FR2017/051658, filed Jun. 22, 2017, which in turn claims priority to French patent application number 1656060 filed Jun. 29, 2016. The content of these applications are incorporated herein by reference in their entireties.

The invention relates to aeronautical glazing units, the use of which is particularly demanding: bird strike, pressure differences between the outside and the inside, exposure to very low temperatures on the external side. For these glazing units, it is necessary to guarantee a high level of mechanical strength, of transparency and of optical quality which are preserved in a lasting manner.

It is known to physically modify a sheet of polymer material such as acrylic, in particular poly(methyl methacrylate) (PMMA), by stretching, for example in two perpendicular directions in the plane of the sheet (biaxial stretching), in order to give it a resistance to stress relaxation by microcrazing, that is to say a high optical quality that is durable upon exposure to cold, to mechanical abrasion and to chemical compounds, resistance to moisture from the air, and also an ability to be pierced which is necessary in the event of bolting the glazing unit to the body or the cabin of a vehicle, a frame or a mounting structure, and an improvement in the mechanical strength (bird strike, etc.).

However, the stretching process is tricky, long and expensive (loss of material, price of the material, etc.). The material thus stretched has the drawback of reverting when it is subjected to temperatures above around 100° C., limiting and complicating the thermoforming processes: the material is thermoformed and must be re-stretched, it is stressed by blowing or another process. The stretched material therefore has a risk of loss of sizing in the event of accidental exposure.

The invention aims to use transparent polymers, in particular acrylics, comprising in their polymer chain blocks that are nanostructured and/or supplemented with microfillers or nanofillers that limit crack propagation, for applications of complex transport glazing units having increased mechanical properties in the form of flat or curved, laminated and/or multiple glazing units. These modified polymers do not require a complicated stretching process and offer a greater ease of forming by thermoforming (dimensional stability); they are not prestressed and have increased safety in the event of exposure to heat (airplane portholes for example).

One subject of the invention is therefore an aeronautical glazing unit comprising at least one sheet of modified acrylic, characterized in that this sheet is combined with at least one other sheet of modified acrylic, and/or at least one sheet of cast poly(methyl methacrylate) (PMMA), and/or at least one sheet of another transparent polymer such as polycarbonate (PC), and/or at least one sheet of glass in particular that is chemically strengthened, as a laminated and/or multiple glazing unit.

Within the meaning of the invention, a "modified acrylic" is understood to mean a transparent acrylic polymer chemically modified to improve its mechanical properties, which has the following characteristics:
density<1.2;
flexural modulus>2000, preferably 2300 MPa;
unnotched Charpy impact strength>35, preferably 40 kJ/m$^2$;
light transmission (wavelengths of the visible spectrum)>90%;
haze<1;
thermal expansion coefficient 70 ppm/° K;
chemical resistance: resistance to microcrazing in contact with a toluene/isobutyl acetate cataplasm according to the United States of
America military standard MIL-P-25690>17 MPa.

A cast PMMA is known to offer the best optical quality of transparency relative to an extruded PMMA.

A laminated glazing unit comprises several mineral (glass) and/or organic (polymer material) transparent rigid sheets connected to one another by interlayer adhesive layers described in detail below.

A multiple glazing unit has several mineral and/or organic, monolithic and/or laminated, transparent rigid sheets, separated from one another by a space filled with dry gas or air.

All these sheets are flat or curved.

Preferably, the modified acrylic is an acrylic polymer with improved mechanical properties comprising, in its polymer chain, blocks that are nanostructured and/or supplemented with microfillers or nanofillers that limit crack propagation.

In one preferred but non-obligatory embodiment of the invention, the cast poly(methyl methacrylate) (PMMA) is physically modified to withstand stress relaxation by microcrazing. The physical modification consists in particular of a biaxial stretching; it is advantageous in that it makes it possible to pierce the PMMA or else when this PMMA is on the outer face of a glazing unit subjected to cold or to mechanical abrasion, without microcracks forming in the sheet of PMMA.

According to other preferred features of the aeronautical glazing unit of the invention:
- a sheet of modified acrylic is adhesively bonded to another sheet of modified acrylic or to a sheet of cast poly(methyl methacrylate) (PMMA), or else to a sheet of glass by means of polyvinyl butyral (PVB) free of any plasticizer that reacts with the acrylics, or thermoplastic polyurethane (TPU);
- a sheet of modified acrylic is adhesively bonded to a sheet of polycarbonate (PC) by means of thermoplastic polyurethane (TPU);
- before being adhesively bonded to another sheet, the surface of a sheet of modified acrylic, or of cast poly(methyl methacrylate) (PMMA), is subjected to a priming treatment; the priming has the effect of improving the quality and the durability of the adhesive bonding; when it is bonded to another sheet, the glass, in particular which is chemically strengthened-toughened, may also be primed, unlike a sheet of polycarbonate which is never primed, since it is particularly degraded by many chemical compounds;
- at least one sheet of modified acrylic is overhanging relative to the sheets of the glazing unit formed of another material, in particular when the high mechanical quality of this material is benefited from in order to pierce the overhanging parts with a view to fitting the glazing unit by bolting or the like, or else for fitting the glazing unit by pinching;
- it is curved.

Another subject of the invention is the use of an aeronautical glazing unit as described above as a glazing unit for an airborne vehicle, in particular a helicopter or an airplane, whether it is a transport vehicle, a combat vehicle or a fighter aircraft.

BRIEF DESCRIPTION OF THE DRAWINGS

The invention will be better understood in light of the appended FIGS. 1 to 12, which all schematically represent various embodiments of aeronautical glazing units in accordance with the invention.

All the materials denoted below by the same terms are identical.

Figure 1:
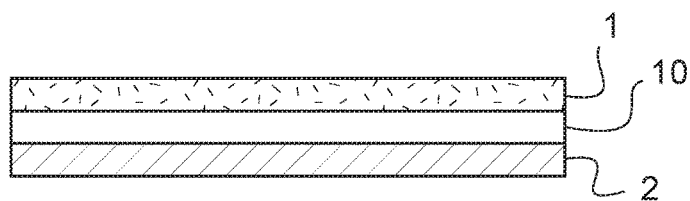
FIG. 1 schematically illustrates an aeronautical glazing unit in accordance with a first embodiment of the invention.

With reference to FIG. 1, an aeronautical double glazing unit in accordance with the invention is composed of:
  a sheet of modified acrylic 1 having a thickness at least equal to 1 mm, preferably 1.5 mm, at most equal to 25 mm, preferably 12 mm, sold by Arkema under the registered trademark Altuglas® Shield Up,
  an air space 10, and
  a sheet of cast PMMA 2, optionally physically modified such as by stretching, having a thickness at least equal to 0.5 mm, preferably 3 mm, at most equal to 25 mm, preferably 8 mm, an acrylic polymer of aeronautical grade sold by the company Evonik® under the reference GS 249.

The sheet of modified acrylic 1 preferably constitutes the outer face of the glazing unit, that is to say the one exposed to the external atmosphere, but it is not excluded for it to constitute, on the contrary, the inner face thereof, and in this case for the sheet of acrylic polymer of aeronautical grade to constitute the outer face of the glazing unit.

Figure 2:
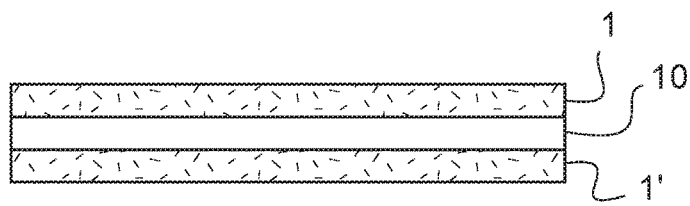
FIG. 2 schematically illustrates an aeronautical glazing unit in accordance with a second embodiment of the invention.

The aeronautical glazing unit represented in FIG. 2 differs from that of FIG. 1 in that it is composed of two sheets of modified acrylic 1 and 1' and in that the sheet 1, constituting the outer face of the glazing unit, here has a thickness at least equal to 0.5 mm, preferably 3 mm, at most equal to 25 mm, preferably 8 mm, the sheet 1' being identical to the sheet 1 from FIG. 1.

Figure 3:
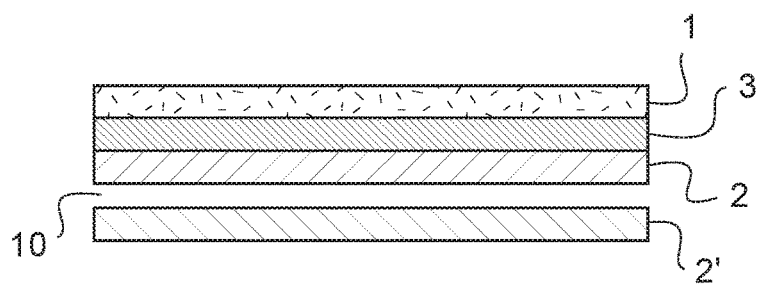
FIG. 3 schematically illustrates an aeronautical glazing unit in accordance with a third embodiment of the invention.

FIG. 3 represents an aeronautical double glazing unit composed of a laminated glazing unit with three constituents 1, 3, 2, an air space 10 and a sheet of cast PMMA 2'.

The sheet of modified acrylic 1 is identical to the sheet 1 from FIG. 1. The two sheets of cast PMMA 2, 2' have a thickness at least equal to 0.8 mm, preferably 1.5 mm, at most equal to 80 mm, preferably 12 mm.

The sheet of modified acrylic 1 and the sheet of cast PMMA 2 are adhesively bonded by means of an interlayer adhesive 3 having a thickness at least equal to 0.1 mm, preferably 0.38 mm, at most equal to 20 mm, preferably 2.5 mm, in particular equal to 1.25 mm.

According to a first variant, the interlayer adhesive 3 consists of thermoplastic polyurethane (TPU) sold by the company Huntsman under the registered trademark Crystalflex® PE 399 or 499 and the sheets of modified acrylic 1 and of cast PMMA 2 are subjected, prior to the assembly as laminate, to a priming by a composition based on methyl methacrylate and on 1-propanamine, 3-(triethoxysilyl) and 1,2-ethanediamine, N-[3-(trimethoxysilyl)-propyl] organosilanes sold under the respective names of DOW CORNING® Z-6011 SILANE and DOW CORNING Z-6020® SILANE.

According to a second variant, the interlayer adhesive 3 consists of polyvinyl butyral having a plasticizer that does not react with the acrylics, sold by the company Eastman Solutia under the name PVB DB 31 or PVB DS 31 and the sheets of modified acrylic 1 and of cast PMMA 2 are subjected, prior to the assembly as laminate, to a priming by a composition based on methyl methacrylate.

The sheet of modified acrylate 1 constitutes the face of the glazing unit on the outside of the airborne vehicle.

Figure 4:
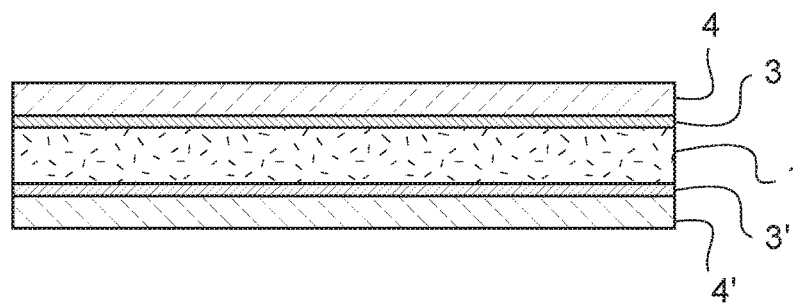
FIG. 4 schematically illustrates an aeronautical glazing unit in accordance with a fourth embodiment of the invention.

Represented in FIG. 4 is a symmetrical laminated aeronautical glazing unit in which two sheets of chemically toughened glass 4, 4' having thicknesses at least equal to 0.1 mm, preferably 0.55 mm, at most equal to 20 mm, preferably 8 mm, are adhesively bonded on either side of a sheet of modified acrylic 1 identical to the one from FIG. 1 by means of an interlayer adhesive layer 3, 3' identical to the one from FIG. 3 made of thermoplastic polyurethane.

Figure 5:
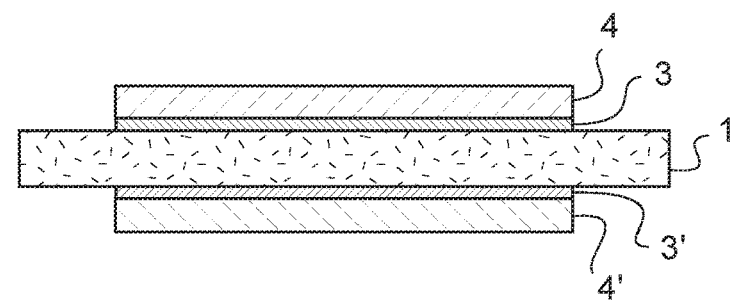
FIG. 5 schematically illustrates an aeronautical glazing unit in accordance with a fifth embodiment of the invention.

The aeronautical glazing unit from FIG. 5 differs from the one from FIG. 4 only in that the sheet of modified acrylic 1 is overhanging. The overhanging part of this sheet may be pierced with a view to fitting the glazing unit by bolting, or else the glazing unit fitted with pinching in particular of this overhanging part.

Figure 6:
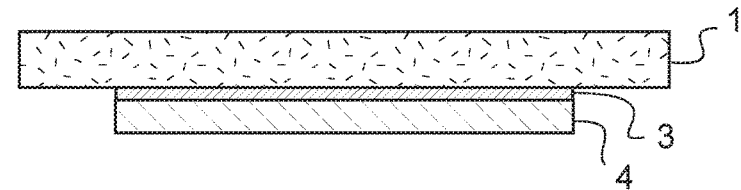
FIG. 6 schematically illustrates an aeronautical glazing unit in accordance with a sixth embodiment of the invention.

The aeronautical glazing unit from FIG. 6 is asymmetrical and differs from the one from FIG. 5 by the removal of a sheet of glass and of its associated interlayer adhesive layer on a single side of the sheet of modified acrylic 1. The latter is capable of constituting both the outer and inner face of the glazing unit.

Figure 7:
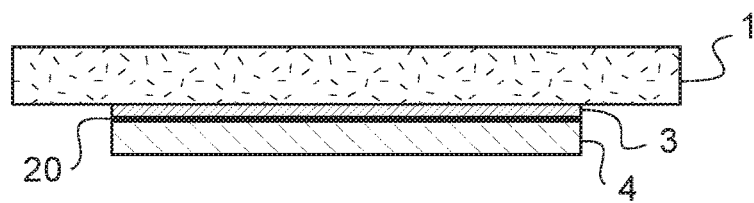
FIG. 7 schematically illustrates an aeronautical glazing unit in accordance with a seventh embodiment of the invention.
Figure 8:
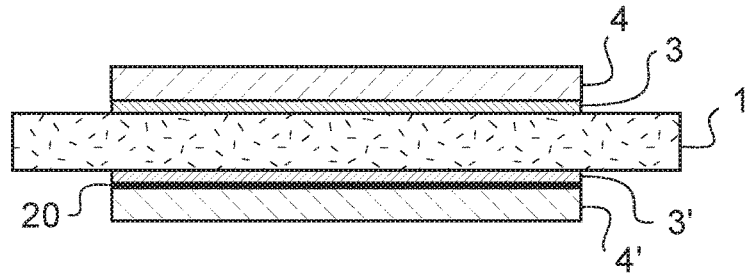
FIG. 8 schematically illustrates an aeronautical glazing unit in accordance with an eighth embodiment of the invention.

The aeronautical glazing unit from FIG. 7 differs from the one from FIG. 6, respectively the one from FIG. 8 differs from the one from FIG. 5, only by the addition of a functional thin layer 20 on the face inside the laminate of the sheet of glass 4, respectively 4'. The functional layer 20 is for example a heating layer for instance made of tin-doped indium oxide ITO (indium tin oxide), having a deicing and/or demisting function, or a thermal control layer such as solar protection layer (that reflects solar radiation).

Figure 9:
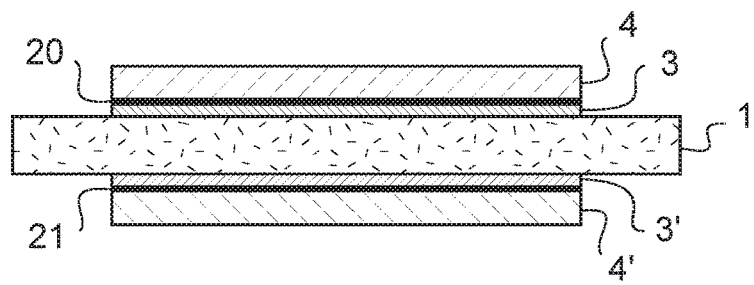
FIG. 9 schematically illustrates an aeronautical glazing unit in accordance with a ninth embodiment of the invention.

FIG. 9 differs from FIG. 8 only in that both sheets of glass 4, 4' and not just one bear a functional layer 20, 21 on their inner face.

Figure 10:
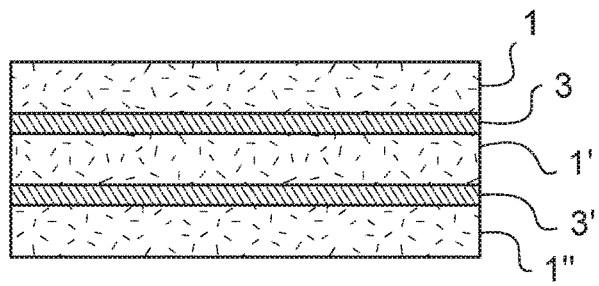
FIG. 10 schematically illustrates an aeronautical glazing unit in accordance with a tenth embodiment of the invention.

FIG. 10 represents a laminated aeronautical glazing unit having several sheets of modified acrylic 1, 1', 1" adhesively bonded to one another by interlayer adhesive layers 3, 3' in the manner described above, after having been subjected to a priming treatment. In all the glazing units represented here, each sheet of modified acrylic 1, 1', 1" may be replaced by a laminate similar to the one from FIG. 10, just like each sheet of glass 4, 4' may be replaced by a laminate of several sheets of glass bonded to one another by interlayer adhesive layers of PVB or the like.

Figure 11:
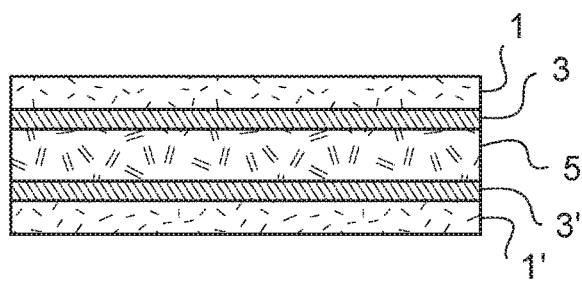
FIG. 11 schematically illustrates an aeronautical glazing unit in accordance with an eleventh embodiment of the invention, and FIG. 12 schematically illustrates an aeronautical glazing unit in accordance with a twelfth embodiment of the invention.

In FIG. 11, a laminated aeronautical glazing unit consists of two sheets of modified acrylic 1, 1' adhesively bonded to either side of a sheet of polycarbonate 5 having a thickness at least equal to 1 mm, preferably 2.5 mm, at most equal to 12 mm, by means of interlayer adhesive layers 3, 3' of thermoplastic polyurethane (TPU) (comprising no plasticizer that would be capable of attacking the polycarbonate), after the two sheets of modified acrylic 1, 1' have been primed according to the first variant described above.

The invention also extends to a laminate comprising the structure obtained from that of FIG. 11, by removing the sheet of modified acrylic 1' and the layer of TPU 3' therefrom and by coating the thus freed-up surface of the sheet of polycarbonate 5 with a hard non-scratch coating or varnish, in particular of polysiloxane type. Mention may be made, as an example of a sheet of polycarbonate coated on one face with a non-scratch coating, of a sheet sold by the company Sabic Innovative Plastics under the registered trademarks Lexan® Margard® HLGA3. The polycarbonate face coated with a hard non-scratch coating constitutes an outer face of a laminated glazing unit, preferably intended to be exposed to the internal atmosphere of an airborne vehicle passenger compartment.

Figure 12:
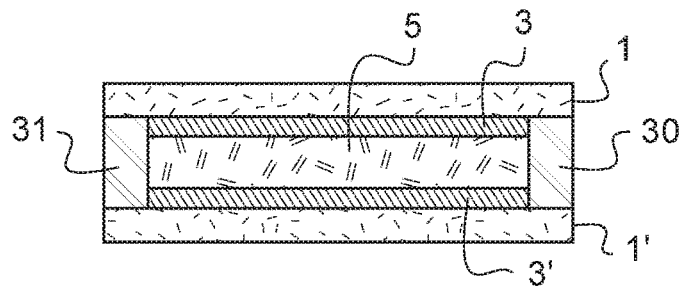

The aeronautical glazing unit represented in FIG. 12 differs from the one from FIG. 11 in that the sheets of modified acrylic 1, 1' overhang the sheet of polycarbonate 5. The latter is fragile, and cannot be pierced. The empty space at the periphery of the polycarbonate sheet 5 is plugged by compensating blocks 30, 31 formed for example of a thermosetting polyester-methyl methacrylate, epoxy-glass fiber, etc. composite suitable for protecting the edge of the polycarbonate sheet, both mechanically and chemically.

In order to fasten the glazing unit in its fitting environment, the overhanging parts of the two sheets of modified acrylic 1, 1' and also the compensating blocks 30, 31 are pierced and suitable screw fastening means are used such as bolts, nuts, etc. Load-bearing bushings, which are not represented, are inserted into the holes pierced in the compensating blocks 30, 31 in order to avoid crushing the sheets of modified acrylic 1, 1'.

The aeronautical glazing units according to the invention are perfectly suitable for an aeronautical application, or even for all transport vehicles (land-based, waterborne or airborne) or even for a building having a safety, anti-burglary or anti-intrusion requirement. In particular they form excellent glazing units for airplanes or helicopters of all sizes, which are pinch-fitted, bolted and/or demisting and/or deicing.

The invention claimed is:

1. An aeronautical glazing unit comprising at least one sheet of modified acrylic, wherein the at least one sheet of modified acrylic is combined with at least one other sheet of modified acrylic, and/or at least one sheet of cast poly (methyl methacrylate), and/or at least one sheet of another transparent polymer and/or at least one sheet of glass, as a laminated and/or multiple glazing unit, wherein the modified acrylic is an acrylic polymer comprising, in its polymer chain, blocks that are nanostructured and/or supplemented with microfillers or nanofillers that limit crack propagation and wherein the at least one sheet of modified acrylic has the following characteristics:
density<1.2;
flexural modulus>2000;
unnotched Charpy impact strength>35 $kJ/m^2$;
light transmission (wavelengths of the visible spectrum)> 90%;
haze<1;
thermal expansion coefficient≤70 ppm/° K;
chemical resistance: resistance to microcrazing in contact with a toluene/isobutyl acetate cataplasm according to the United States of America military standard MIL—P—25690>17 MPa.

2. The aeronautical glazing unit as claimed in claim 1, wherein the cast poly(methyl methacrylate) is physically modified to withstand stress relaxation by microcrazing.

3. The aeronautical glazing unit as claimed in claim 1, wherein a sheet of modified acrylic is adhesively bonded to another sheet of modified acrylic or to a sheet of cast poly(methyl methacrylate), or else to a sheet of glass by means of polyvinyl butyral free of any plasticizer that reacts with the acrylics, or thermoplastic polyurethane.

4. The aeronautical glazing unit as claimed in claim 1, wherein a sheet of modified acrylic is adhesively bonded to a sheet of polycarbonate by means of thermoplastic polyurethane.

5. The aeronautical glazing unit as claimed in claim 3, wherein before being adhesively bonded to another sheet, the surface of a sheet of modified acrylic, or of cast poly(methyl methacrylate), is subjected to a priming treatment.

6. The aeronautical glazing unit as claimed in claim 1, wherein at least one sheet of modified acrylic is overhanging relative to the sheets of the glazing unit formed of another material.

7. The aeronautical glazing unit as claimed in claim 1, wherein the aeronautical glazing unit is curved.

8. A method comprising utilizing an aeronautical glazing unit as claimed in claim 1 as a glazing unit for an airborne vehicle.

9. The aeronautical glazing unit as claimed in claim 1, wherein the at least one sheet of another transparent polymer is a sheet of polycarbonate.

10. The aeronautical glazing unit as claimed in claim 1, wherein the at least one sheet of glass is chemically strengthened.

11. The method as claimed in claim 8, wherein the airborne vehicle is a helicopter or an airplane.

* * * * *